(12) United States Patent
Tremblay et al.

(10) Patent No.: US 10,374,972 B2
(45) Date of Patent: Aug. 6, 2019

(54) VIRTUAL FLOW NETWORK IN A CLOUD ENVIRONMENT

(71) Applicants: Benoit Tremblay, Laval (CA); Suresh Krishnan, Johns Creek, GA (US)

(72) Inventors: Benoit Tremblay, Laval (CA); Suresh Krishnan, Johns Creek, GA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 237 days.

(21) Appl. No.: 14/711,444

(22) Filed: May 13, 2015

(65) Prior Publication Data
US 2015/0334045 A1  Nov. 19, 2015

Related U.S. Application Data

(60) Provisional application No. 61/992,581, filed on May 13, 2014.

(51) Int. Cl.
*H04L 12/911* (2013.01)
*H04L 12/931* (2013.01)
*H04L 12/713* (2013.01)
*H04L 12/715* (2013.01)
*H04L 12/851* (2013.01)
*H04L 12/24* (2006.01)
*H04L 12/717* (2013.01)

(52) U.S. Cl.
CPC ............ *H04L 47/783* (2013.01); *H04L 41/12* (2013.01); *H04L 45/586* (2013.01); *H04L 45/64* (2013.01); *H04L 47/2441* (2013.01); *H04L 49/35* (2013.01); *H04L 49/70* (2013.01); *H04L 45/42* (2013.01)

(58) Field of Classification Search
CPC ...... H04L 45/64; H04L 47/2441; H04L 49/70
See application file for complete search history.

(56) References Cited

U.S. PATENT DOCUMENTS

| 2011/0110268 A1* | 5/2011 | Panasyuk | ................ H04L 41/12 370/254 |
| 2011/0299413 A1* | 12/2011 | Chatwani | ............ H04L 12/4625 370/252 |
| 2013/0044641 A1* | 2/2013 | Koponen | ................ H04L 12/66 370/255 |

(Continued)

OTHER PUBLICATIONS

Kang, Nanxi et al., "Optimizing the 'One Big Switch' Abstraction in Software-Defined Networks," Proceedings of the Ninth ACM Conference on Emerging Networking Experiments and Technologies, Context 13: New York, NY (Dec. 2013), pp. 13-24 (ISBN: 978-1-45-032101-3).

(Continued)

*Primary Examiner* — June Y Sison (57) ABSTRACT

A system and method for virtualizing a flow switch to be used by application providers in a cloud computing environment is provided. An application provider's packet handling rules are received by a cloud management system. The rules are translated from the application provider's overlay topology to the underlay data center topology. The underlay network elements involved in the received rules can be identified. A translated rule can be decomposed into a plurality of rule portions which are transmitted to the appropriate underlay network elements.

15 Claims, 9 Drawing Sheets

(56) References Cited

U.S. PATENT DOCUMENTS

2013/0103817 A1   4/2013  Koponen et al.
2015/0263901 A1*  9/2015  Kumar .................... H04L 41/12
                                                    370/254
2016/0301595 A1* 10/2016  Ashida ................... H04L 69/22

OTHER PUBLICATIONS

Banikazemi, Mohammad et al., "Meridian: An SDN Platform for Cloud Network Services," IEE Communications Magazine, IEEE Service Center: Piscataway, US (Feb. 2013), pp. 120-127.
PCT International Search Report from corresponding application PCT/IB2015/053542, dated Aug. 31, 2015; 5 pages.

* cited by examiner

VIRTUAL FLOW NETWORK IN A CLOUD ENVIRONMENT

CROSS REFERENCE TO RELATED APPLICATIONS

This application claims the benefit of priority to previously filed U.S. Provisional Patent Application No. 61/992,581 entitled "Virtual Flow Network in a Cloud Environment" and filed on May 13, 2014, the contents of which are incorporated herein by reference.

TECHNICAL FIELD

This disclosure relates generally to systems and methods for translating overlay network commands into the underlying infrastructure network elements.

BACKGROUND

Infrastructure as a Service (IaaS) is a cloud computing business model where a data center operator provides computing, storage and network capacity resources to application or service providers on an on-demand and pay-as-you-go basis. An application provider can use those resources to deploy applications and services for their own customers. The amount of resources used varies as needed, and application providers pay only for those resources used rather than for a fixed capacity (e.g. usually the peak capacity) if they owned the actual physical resources.

Virtualization is used by IaaS providers to allocate, move and manage resources, allowing a dynamic management of the resources matching the changing demand. This is true both for the processing capacity (e.g. virtual machines) and for the network (e.g. using VLANs, VXLAN, etc.).

In conventional IaaS management systems, it is possible to create virtual machines (VMs), to allocate storage capacity and to establish basic layer 2 (L2) or layer 3 (L3) connectivity between the VMs and with the storage. For example in OpenStack, the Network service enables the creation of L2 networks and allows the VMs to be connected through virtual network interface cards (vnic) to ports on those networks. IP addresses can be assigned to the vnic. The L2 networks can then be connected to virtual routers/switches that can handle L3 forwarding between the different L2 networks or to/from the internet.

The concept of Software Defined Networking (SDN) allows applications to control how different elements in the network can be connected and manage the traffic. SDN aims to replace conventional, rigid network management by a flexible software framework for controlling the traffic flow in the network. The new framework is expected to enable deployment of new network services more rapidly than the previous network management and control could allow.

OpenFlow is an open standard protocol between the control and forwarding planes used in SDN applications. A control platform running on one or more servers in the network manages a set of OpenFlow switches with only basic forwarding capabilities. The control platform collects information from the switches and operator configuration and then computes/distributes the forwarding rules to the switches. A logically centralized controller can more easily coordinate the state among the various switching platforms and provide a flexible programmatic interface to build various new protocols and management applications. This separation significantly simplifies modifications to the network control logic (as it is centralized), enables the data and control planes to evolve and scale independently, and potentially decreases the cost of the forwarding plane elements.

OpenFlow was a precursor for SDN and is used in data centers to establish virtual network connectivity between VMs. It enables quick configuration of the network elements in the data center by the central controller. It provides isolation between the different tenants (application providers) hosted in the data center. SDN is also used by network operators to establish connectivity between different network functions as it provides a more flexible framework for managing how those functions will be composed, or chained, depending on specific needs in their network or specific customer needs. SDN is often used in data centers offering cloud services. It is used to dynamically connect VMs belonging to a given tenant while ensuring isolation between the VMs and the virtual networks.

Network function virtualization is a trend being pushed forward by large operators that aims at bringing the network functions that traditionally run on specialized physical hardware into the cloud/data center to enable quick deployment, dynamic scaling and the use of the low cost hardware available in data centers.

Operators use different middlebox services, called inline services, such as Deep Packet Inspection (DPI), Load balancing, Firewall, Intrusion Detection and Prevention (IDP), Network Address Translation (NAT), HTTP header enrichment, and others to handle subscriber traffic. Inline services can be hosted on dedicated physical hardware or in VMs. Service chaining is required if the traffic needs to go through more than one inline services. If more than one chain of services is possible, then the operator needs to configure the networking infrastructure to direct the right traffic through the right inline service path. This is typically done by configuring L2 or OpenFlow network nodes to steer traffic from one service to the other in different paths depending on packet flows (e.g. source, destination or content of the packet flow).

In line with the Network function virtualization initiative, many network functions are being ported to the virtual environment and can run as cloud appliances in VMs in the cloud. Cloud management systems often use SDN for establishing and controlling the basic L2 and L3 connectivity between VMs. However, they do not allow application provider to get full control of the created virtual networks and to use SDN to connect their VMs rather than using basic L2 and L3 connectivity to steer the traffic between the virtual nodes. In normal L2 forwarding, a switch uses the destination MAC address and VLAN to determine how to forward a packet to its next hop. In L3 forwarding, a router uses the destination IP address to determine the next hop. In a flow-based forwarding scheme, traffic can be steered/forwarded using more complex rules involving multiple fields in the packet headers, using a combination of L2, L3 or higher in the protocol stack (TCP, UDP, etc.).

Restricting the application provider's control of the virtual network connectivity to conventional methods can be limiting when a fine granularity of control of the underlying network is required (e.g. when the path traversed through the network/VMs is set "per flow" instead of "per endpoint"). This can make it difficult to implement arbitrary virtual network functions in the cloud. Service chaining is a typical example of such a function.

Therefore, it would be desirable to provide a system and method that obviate or mitigate the above described problems.

SUMMARY

It is an object of the present invention to obviate or mitigate at least one disadvantage of the prior art.

In a first aspect of the present invention, there is provided a method for distributing flow rules. The method includes receiving a packet handling rule, the rule including a match field and an associated action to be applied to incoming packets. The packet handling rule is translated from an overlay network topology to an underlay network topology. It is determined that the match field maps to a first underlay switch and the action maps to a second underlay switch. The translated packet handling rule is decomposed into a first rule portion associated with the first underlay switch and a second rule portion associated with the second underlay switch. The first rule portion is transmitted to the first underlay switch and the second rule portion is transmitted to the second underlay switch.

In a second aspect of the present invention, there is provided a network node for distributing rules. The network node comprises a processor and a memory, the memory containing instructions executable by the processor whereby the network node is operative to receive a packet handling rule, the rule including a match field and an associated action to be applied to incoming packets. The network node is operative to translate the packet handling rule from an overlay network topology to an underlay network topology. The network node determines that the match field maps to a first underlay switch and the action maps to a second underlay switch. The network node decomposes the translated packet handling rule into a first rule portion associated with the first underlay switch and a second rule portion associated with the second underlay switch. The network node transmits the first rule portion to the first underlay switch and transmits the second rule portion to the second underlay switch.

In another aspect of the present invention, there is provided a rules manager comprising a rule reception module, a translation module, a mapping module, a decomposition module, and a rule transmission module. The rule reception module is for receiving a packet handling rule, the rule including a match field and an associated action to be applied to incoming packets. The translation module is for translating the packet handling rule from an overlay network topology to an underlay network topology. The mapping module is for determining that the match field maps to a first underlay switch and the action maps to a second underlay switch. The decomposition module is for decomposing the translated packet handling rule into a first rule portion associated with the first underlay switch and a second rule portion associated with the second underlay switch. The rule transmission module is for transmitting the first rule portion to the first underlay switch and the second rule portion to the second underlay switch.

In another aspect of the present invention, there is provided a computer readable storage medium storing executable instructions, which when executed by a processor, cause the processor to receive a packet handling rule, the rule including a match field and an associated action to be applied to incoming packets; translate the packet handling rule from an overlay network topology to an underlay network topology; determine that the match field maps to a first underlay switch and the action maps to a second underlay switch; decompose the translated packet handling rule into a first rule portion associated with the first underlay switch and a second rule portion associated with the second underlay switch; and transmit the first rule portion to the first underlay switch and the second rule portion to the second underlay switch.

In some embodiments, the decomposed first rule portion can include the match field and the second rule portion can include the action.

In some embodiments, match field of the packet handling rule can include an overlay network ingress port. The overlay network ingress port can be mapped to an underlay network ingress port on the first underlay switch.

In some embodiments, the first rule portion can be modified by adding a first action to forward incoming packets to the second underlay switch. The first rule portion can be optionally modified to add a second action to tag incoming packets with a flow identifier. The second rule portion can be optionally modified to add a first match field corresponding to the flow identifier.

In some embodiments, responsive to determining that the match field does not specify an ingress port, the first rule portion can be transmitted to a plurality of underlay switches. Optionally, this can include all underlay switches in the network.

In some embodiments, the action of the packet handling rule can include an overlay network egress port. The overlay network egress port can be mapped to an underlay network egress port on the second underlay switch.

The various aspects and embodiments described herein can be combined alternatively, optionally and/or in addition to one another.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

In a service network, an operator is able to define service policies that specify traffic classes and the chain of services that each class of traffic must traverse. These policies are translated by the controller into rules that are sent to and programmed on the switches in the service network. These rules steer the network traffic through the chain of services specified by the policies.

Embodiments of the present invention are directed towards to creating a virtual network abstraction called a "flow network" that allows an application provider to have better control of the network connectivity between the virtual machines (VMs) deployed in its virtual infrastructure. The flow network exposes a virtual, or logical, switch in the cloud with flow control managed by the application provider, while de-multiplexing overlay network commands sent to this virtual switch into the underlay network switches. It allows an application provider to port virtualized network functions in the cloud and to compose them at will, as if it was being done in a physical environment.

Some embodiments of the present invention enable a fine-grained control of the connectivity between the VMs in a virtual infrastructure deployed in the cloud. It enables an application provider to leverage SDN solutions that were used in the "bare metal" environment and to reuse them in a cloud context. Service chaining solutions that use SDN/OpenFlow methods to steer the traffic between services can port their solutions in the cloud with only minor modifications.

Some embodiments of the present invention allow for reproducing the behavior of flow switches in a virtualized cloud environment.

Figure 1:
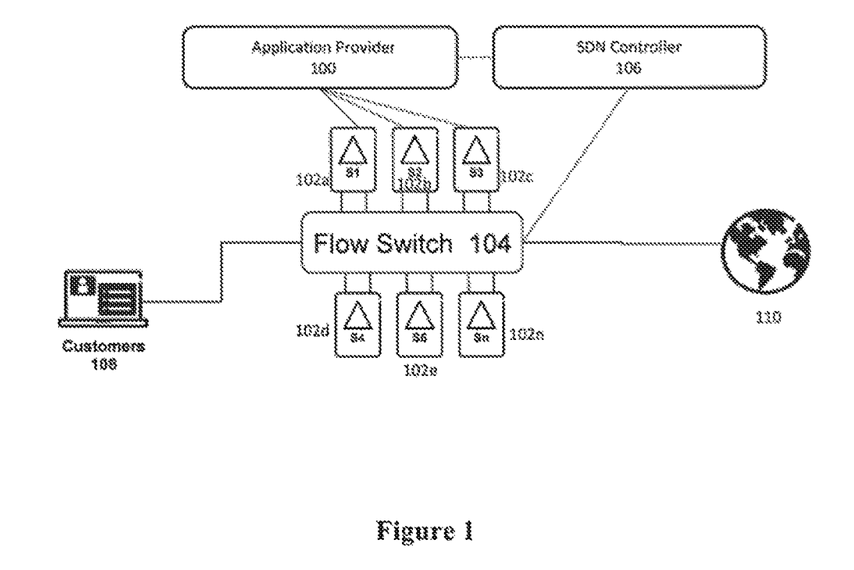
FIG. 1 is a block diagram of an application provider overlay network.

FIG. 1 illustrates an exemplary deployment of service chaining by an application provider using a flow switch. The application provider 100 connects physical nodes 102a-102n to a flow switch 104. Flow switch 104 can be implemented as an OpenFlow hardware switch or a virtual soft switch (vSwitch). The application provider 100 can control the services (S1, S2, S3, S4, S5 . . . Sn) running on the nodes 102a-102n through a management interface. Services S1-Sn can include instances of deep packet inspection (DPI), firewall (FW), and Content Filtering (CF), for example. The application provider 100 can alternatively control the connectivity and traffic steering between these services using an SDN controller 106 that injects and manages flow rules in the flow switch 104. Traffic from customers 108 can traverse the application provider's 100 service network before being routed to an external network 110, such as the Internet.

To port the setup of FIG. 1 into the cloud, the application provider 100 can create VMs using a Cloud Management System (CMS) interface (not shown in FIG. 1) and connect the VMs using a newly created flow network (via the same interface). Embodiments of the present invention allow the application provider 100 (or its SDN controller 106) to interact with the flow network via the CMS (or the Data Center SDN (DC-SDN) instance) to install and manage flow rules. The CMS can also be referred to as the Data Center Management System (DCMS). In some embodiments, in the CMS can manage multiple data centers.

A flow represents a subset of traffic that follows the same conditions according to the packet headers over a given period of time. A certain number of parameters can be used to identify a flow (for example IP source, IP destination, TCP source, TCP destination, etc.). A particular header field can also be "wild-carded" to identify an aggregation of traffic.

Figure 2:
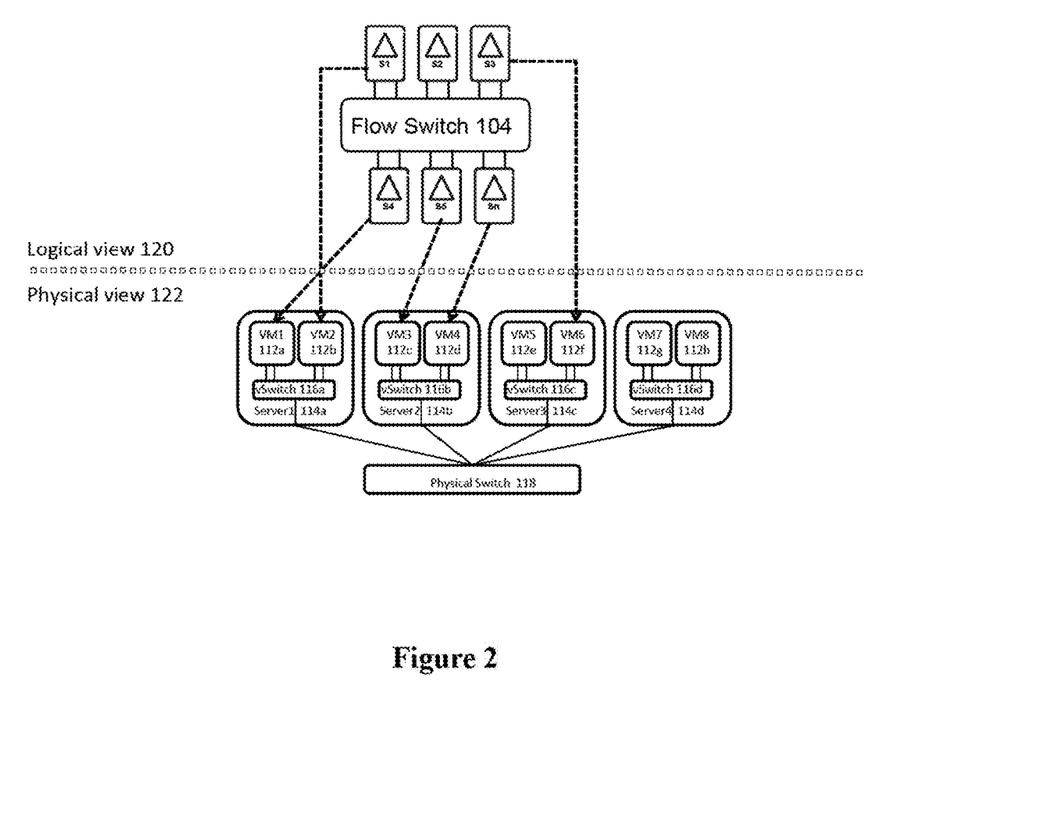
FIG. 2 illustrates the deployment of the overlay network in a data center infrastructure.

FIG. 2 illustrates a representation of the virtual overlay network deployed in a data center infrastructure using the flow network of FIG. 1. The services S1-Sn are shown as being deployed on VMs instead of directly on physical nodes. A virtual network is created to establish connectivity between those VMs. The logical view 120 can be considered an overlay network topology while the physical view 122 can be considered an underlay network topology.

In the logical view 120, the application provider perceives that its assigned VMs are connected through a flow switch 104 that the application provider can control via its SDN controller and/or management interface. In the physical view 122, a number of VMs 112a-112h are shown as deployed over multiple physical servers 114a-114d interconnected by virtual switches 116a-116d and the underlying physical switches 118 in the data center. The flow network is a conceptual component that does not physically exist in the data center. It is implemented using the virtual and/or physical switches available in the data center. Flow rules provided by the application provider to the CMS can be translated, decomposed and deployed in the appropriate virtual and physical switches.

In the example deployment of FIG. 2, logical service instance S1 is shown as being deployed on VM2 112b, service S3 is deployed on VM6 112f, service S4 is deployed on VM1 114a, service S5 is deployed on VM3 112c, and service Sn is deployed on VM4 112d.

It is noted that a virtual inline service can be hosted in a VM, or multiple VMs, hosted on a server on top of a hypervisor. As shown in FIG. 2, multiple virtual inline services S1-Sn can share the resources of the same physical server 114a-114d. For example, S1 is deployed on VM 112b and S4 is deployed on VM 112a which are both hosted by server 114a. An instance of a virtual software switch (vSwitch) 116a-116d can be included on each server 114a-114d for handling the communication between multiple VMs running on the same server. Other methods can be similarly used for this purpose, for example, remote port is a method to offload the switching to a hardware switch. A particular virtual inline service can be running on a dedicated server, either bare metal or using an operating system.

Figure 3:
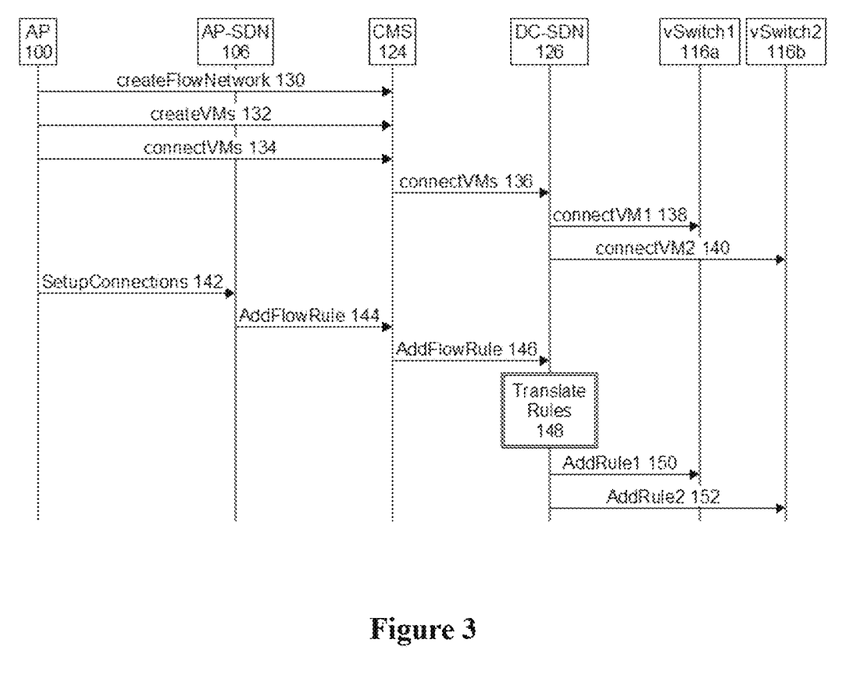
FIG. 3 is a signaling diagram according to an embodiment of the present disclosure.

FIG. 3 is a signaling diagram illustrating an example of the messaging and interactions between the application provider (AP) 100, the CMS 124, and the switches in the data center (vSwitch1 116a and vSwitch2 116b), using a topology similar to as was illustrated in FIG. 2. The application provider 100 can use the CMS 124 interface to create the virtual infrastructure. This can include creating the flow network (step 130), creating VMs (step 132) and establishing basic connections between the VMs through the flow network (step 134). The instructions to connect particular VMs can be received by the CMS 124 and propagated to the DC-SDN 126 (step 136) which, in turn, can propagate the instructions to the appropriate underlying switches (steps 138, 140).

The application provider 100, with its SDN instance (AP-SDN) 106, can then install flow rules in the created flow network in order to control how traffic will be steered between the VMs (step 142). The AP-SDN 106 can communicate via the CMS 124 (step 144) and/or directly with the DC-SDN 126 (step 146) to install a flow rule(s) in the DC-SDN 126. The interface used by the AP-SDN 106 to install/manage the rules can be similar to the interface that one could find on a physical switch supporting flows.

The flow rule(s) received by the DC-SDN 126 are decomposed and translated to configure the physical infrastructure (virtual and physical switches) as required (step 148). The rules provided by the AP 100 for steering traffic between the VMs need to be translated from the virtual (e.g. overlay)

topology as perceived by the AP 100 to the actual (whether physical or virtual) underlay topology configured by the DC-SDN 126 and deployed on the physical nodes in the data center. In the example of FIG. 3, the flow rule received in step 146 is translated and decomposed by the DC-SDN 126 (step 148) into Rule1 and Rule2. The translated and decomposed rules can be mapped to the appropriate underlying switches. Rule1 is installed on vSwitch1 116*a* (step 150) and Rule2 is installed on vSwitch2 116*b* (step 152).

Rule translation from overlay network to underlay network can be done in two ways: distributed or centralized flow steering. In the distributed approach, the rules provided by the AP 100 are adapted to be distributed on each of the virtual switches involved in the implementation of the virtual infrastructure. The DC-SDN controller 126 determines the translation of the virtual infrastructure (of the AP 100) into the physical infrastructure (of the Data Center) and where the rules should be deployed (e.g. which switches need to receive which rules). This will be further illustrated in FIG. 4. Additional tags can be added to the packet to help reduce the number of reclassifications of a packet and can help minimize the number of rules deployed on the physical servers.

Figure 4:
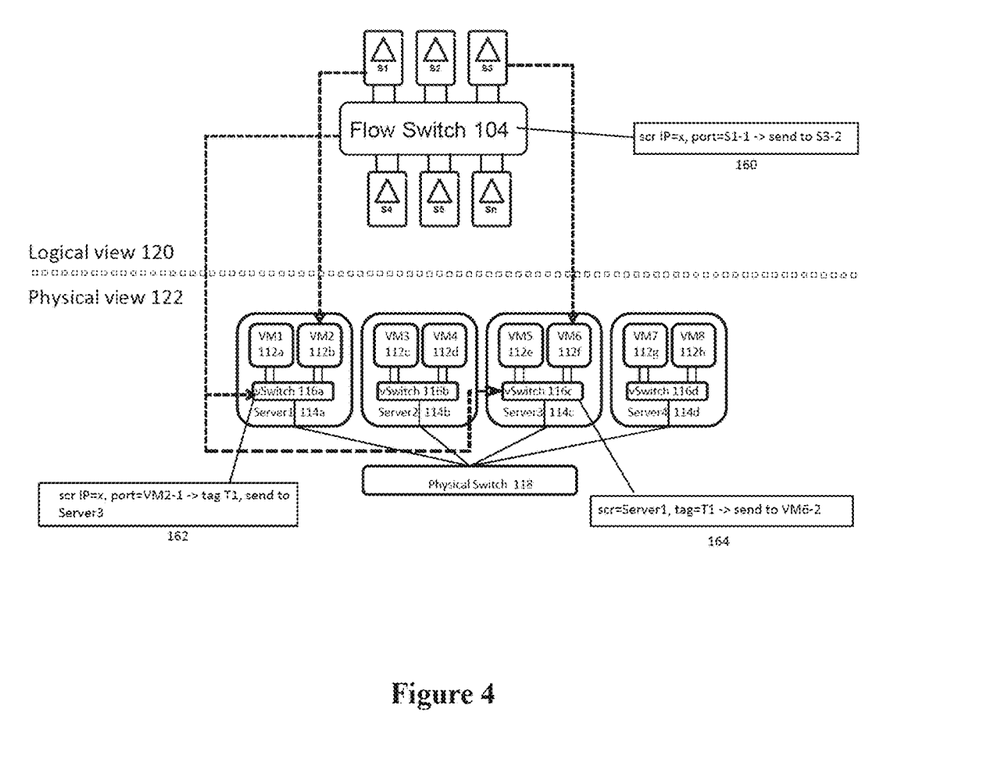
FIG. 4 illustrates an example of a distributed approach for implementing a flow network.

FIG. 4 illustrates an example of the distributed approach for implementing a flow network in the data center. The flow network is logically distributed over the physical servers 114*a*-114*d* involved in the flow network. The rules provided by the AP 100 to the CMS 124 (and/or SDN controller) are translated, decomposed and deployed in the appropriate virtual switches 116*a*-116*d* residing on the physical servers 114*a*-114*d*.

An example flow rule 160 is received by the flow switch 104. In general, a flow rule is comprised of at least one match field and at least one associated action. A match field can be a packet header (or other) value to match a packet against. All incoming packets received by the switch (or vSwitch) will be compared to the match field. If the match is successful, the associated action is applied to the packet. For flow rule 160, the match fields are source IP address=x (which can be any specified IP address) and ingress port=S1-1. The action is to send the packet to port S3-2. In this example, the match field and the action both express the ports in terms of their application provider (e.g. overlay) network identifiers. Flow switch 104 can translate flow rule 160 from the overlay network topology to the underlay network (e.g. data center) topology. Flow switch 104 can maintain and store a mapping of overlay identifiers to underlay identifiers. In this non-limiting example, the source IP address in the match field is not translated. But in other examples it may need to be translated from an overlay network address to an underlay network address as well.

Flow switch 104 determines that overlay ingress port S1-1 maps to underlay port VM2-1 deployed on VM 112*b* and hosted on server1 114*a*. Overlay egress port S3-2 maps to underlay port VM6-2 deployed on VM 112*f* hosted on server3 114*c*. Thus flow rule 160 is determined to involve two different underlay network servers 114*a* and 114*c* and therefore must be distributed to vSwitch 116*a* and vSwitch 116*c*. In particular, the match field maps to a first underlay switch (vSwitch 116*a*) and the action maps to a second, different underlay switch (vSwitch 116*c*).

Flow switch 104 can decompose the flow rule 160 into two portions—a first rule portion 162 associated with vSwitch1 116*a* and a second rule portion 164 associated with vSwitch2 116*c*. Rule portion 162 includes the translated match field, source IP=x, port=VM2-1. Flow switch 104 determines that the action for rule portion 162 is to send the packet to server3 116*c*. A further action is added to rule portion 162 to tag the packet with a flow identifier "T1". Tagging of the packets inside the data center network enables identification of the ingress port on which the packet was received even when transferring the packet to a subsequent physical server where more rules can/will be applied.

Rule portion 164 includes the translated action, send to port VM3-2. The match field of rule portion 164 also needs to be resolved or completed. Flow switch 104 determines that the match field for rule portion 164 is source=server1 114*a*, tag=T1. The resolved rule portions can then be installed on the identified appropriate switches (e.g. rule portion 162 to vSwitch 116*a*, rule portion 164 to vSwitch 116*c*). It will be appreciated that the resulting rule portions of translating and mapping flow rule 160 are installed only on the underlying servers/switches as required by rule 160 itself.

In an alternative embodiment, the approach is to redirect all traffic from the tenant VMs to a centralized node that applies all of the rules. The virtual switches on the physical servers add the information about the ingress port (e.g. the vnic) on which the packet is received into the packet header and forwards the packet to the centralized switch. The centralized switch can apply the flow rules as if the all the ports were connected to that switch. The centralized switch can either be a physical switch or a virtual switch including software running on a physical server.

Figure 5:
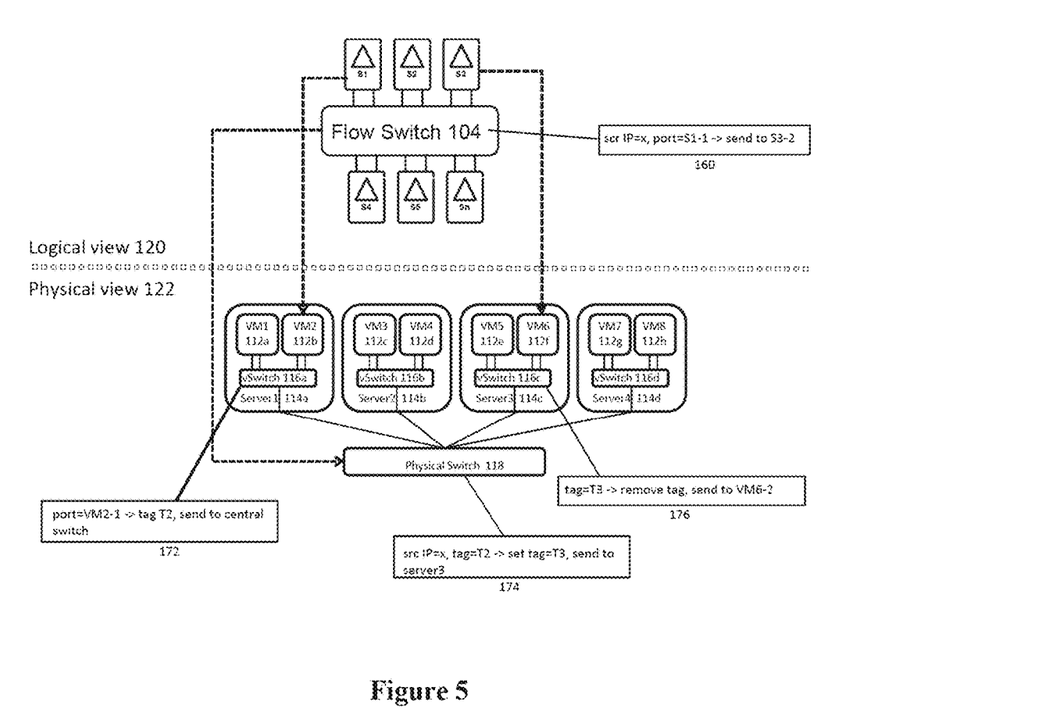
FIG. 5 illustrates an example of a centralized approach for implementing a flow network.

FIG. 5 illustrates an example of the centralized approach for implementing a flow network. All packets transiting between the VMs are forwarded to a centralized switch (for example, physical switch 118) that stores all rules for that flow network instance. The packets entering the flow network (e.g. from the VM nics) can be tagged to identify the source port of the flow network and forwarded to the centralized switch where the flow rules are applied.

Flow rule 160 will again be used to illustrate the approach of FIG. 5. Flow rule 160 comprises match fields source IP address=x, ingress port=S1-1 and action to send packet to port S3-2. Flow switch 104 translates and decomposes flow rule 160 similar to the example of FIG. 4. However, in the example of FIG. 5, a further rule portion must be installed in the central switch 118.

First rule portion 172 includes the translated match field, port=VM2-1, from flow rule 160. Rule portion 172 is completed by adding actions to tag the packet with flow identifier "T2" and to send the packet to the central switch 118. First rule portion 172 is sent to vSwitch 116*a*. A second rule portion 174 is configured to include the match field source IP address=x, tag=T2. The action is configured to be to set the tag to "T3" and to send the packet to server3 114*c*. Second rule portion 174 is sent to central switch 118. A third rule portion 176 includes the translated action, send to port VM3-2, from flow rule 160. Third rule portion 176 is configured to include the match field tag=T3 and an additional action to remove the tag from the packet. Third rule portion 176 is sent to vSwitch 116*c*.

The centralized approach of FIG. 5 can reduce the number of rules stored on each physical server and simplify the translation/adaptation of the rules, but it may increase the number of hops (and hence the latency) a packet needs to traverse before getting to its destination. The distributed approach of FIG. 4 can increase the complexity of the rules translation, but potentially reduces the number of hops packets have to traverse to reach their destination.

Figure 6:
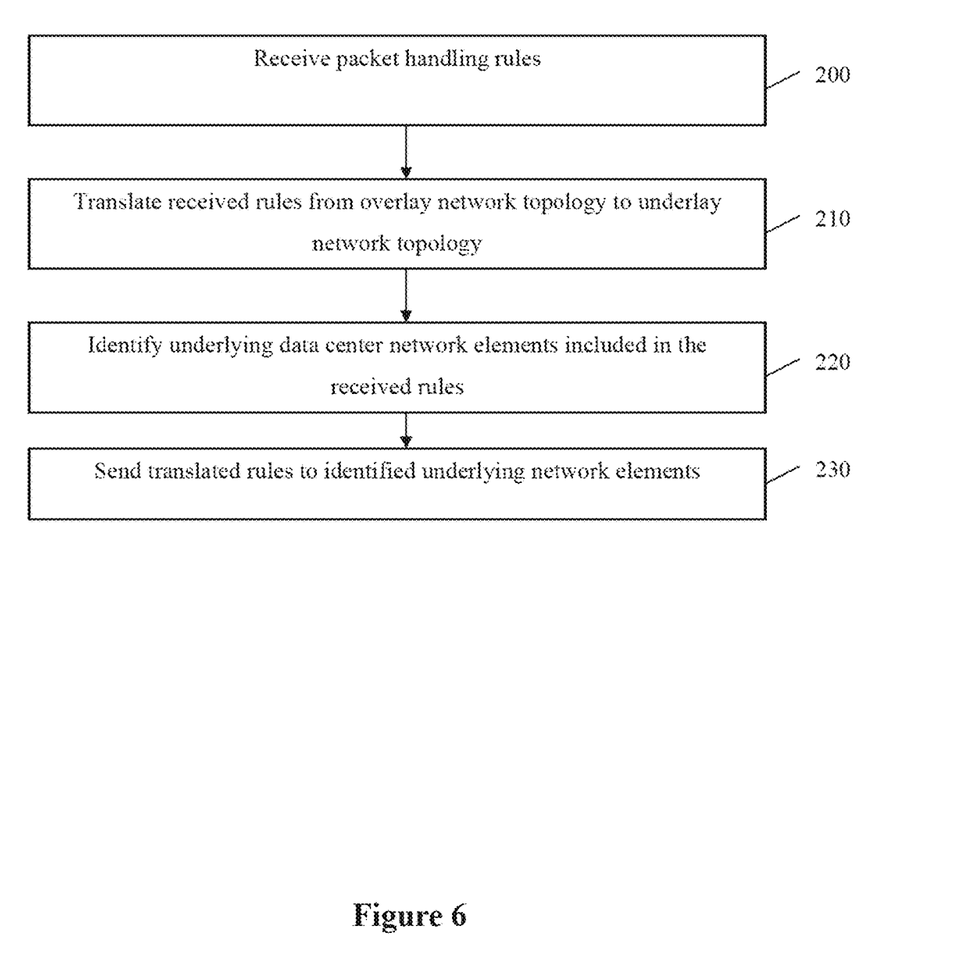
FIG. 6 is a flow chart illustrating a method for implementing a flow network.

FIG. 6 is a flow chart illustrating a method for implementing a flow network in a data center or cloud computing environment. The method begins by receiving at least one packet handling rule (block 200). The packet handling rules can be sent from an application provider to a data center manager such as a CMS, or alternatively to an SDN controller or an access controller. The packet handling rules can include instructions for packet processing, steering, and/or forwarding. In some embodiments, a packet handling rule includes instructions for routing an identified packet(s) between services or destinations. In the rule, these services can be identified by their identities (e.g. network addresses and/or ports) in the virtual overlay infrastructure as is perceived by the application provider.

The received rule(s) are then translated from the application provider's virtual topology (the overlay network) to the actual topology deployed in the data center (the underlay network) (block 210). The "actual" topology of the data center can be virtual or physical. Those skilled in the art will appreciate that there can be multiple levels of virtualized overlay networks corresponding to paths through the underlying physical network. The rule translation can include determining which underlay network elements (physical or virtual) in the data center correspond to entities in the application provider's overlay network.

The underlying data center network elements that are involved in, or affected by, each rule can then be identified (block 220). For a given rule, any underlying network element (e.g. physical or virtual switch) that is included in that rule can be identified as a destination for the rule. The rule is subsequently transmitted to the identified destination network element(s) (block 230). For example, as was shown in FIG. 3, it was determined that the added Flow Rule involved vSwitch1 and vSwitch2. The translated and decomposed Rule1 was transmitted to vSwitch1, while Rule2 was transmitted to vSwitch2. Each individual rule can be selectively sent to only the switches that are affected by that particular rule without being aware of the actual underlying topology of the data center. In some embodiments, every switch in the underlying network does not need to be programmed with the full set of rules for every packet flow that the data center will handle.

Those skilled in the art will appreciate that the process for updating and/or deleting rules can be implemented in a similar manner to the method of FIG. 6.

The method of FIG. 6 can be implemented by a flow switch entity, implemented by a CMS, similar to as discussed with respect to the example rule in FIG. 4. Further, the method of FIG. 6 can optionally be configured to incorporate a centralized switch, similar to as discussed with respect to the example rule of FIG. 5.

Figure 7:
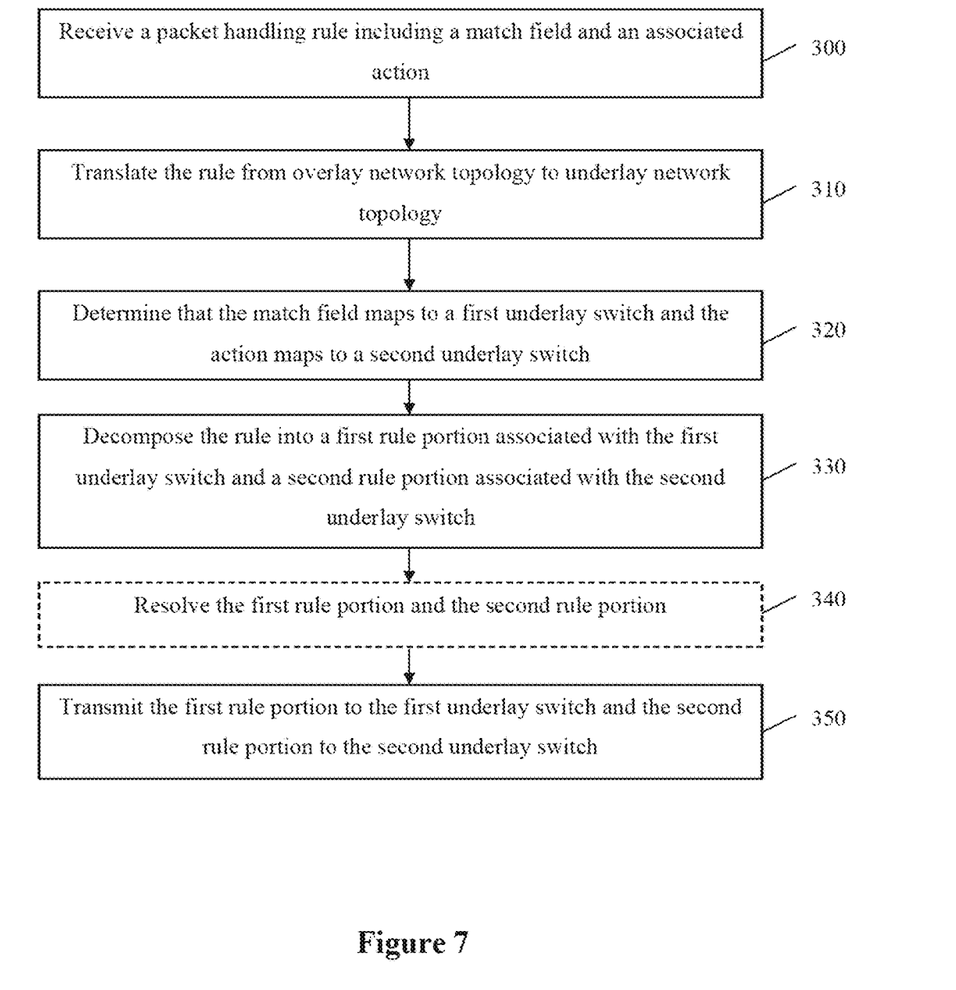
FIG. 7 is a flow chart illustrating a method for distributing flow rules.

FIG. 7 is a flow chart illustrating a method for distributing flow rules. The method can be performed by a flow rule management entity as has been described herein. The method begins by receiving a packet handling rule (block 300). The rule includes a match field and an associated action to be applied to incoming packets. The received packet handling rule is translated from an overlay network topology to an underlay network topology (block 310). The translation step can include translating network identifiers (e.g. IP address, MAC address, port number, etc.) from an overlay network identifier to an underlay network identifier. Each match field and action in the translated rule can be mapped to an underlay network element (e.g. virtual machine, server, switch, etc.) that is associated with the match field and/or action.

It is determined that the match field maps to a first underlay network element and the action maps to a second underlay network element (block 320). In some embodiments, the match field can include an overlay network ingress port a packet is received on. The ingress port can be mapped to an underlay ingress port on a first underlay network switch. In some embodiments, the action can include an overlay network egress port on which a packet is to be transmitted on. The egress port can be mapped to an underlay network egress port on a second underlay network switch. In some embodiments it can be determined that the first and second underlay switches are different virtual switches hosted on different servers. In some embodiments it can be determined that the first and second underlay switches are hosted on different underlying physical switches.

The packet handling rule is decomposed into at least a first rule portion and a second rule portion (block 330). The first rule portion is associated with the first underlay switch. The first rule portion can include the translated match field. The second rule portion is associated with the second underlay switch. The second rule portion can include the translated action. The decomposing step will be understood to include splitting, or dividing, the translated rule into sub-portions in accordance with the underlay switch(es) associated with each such portion.

Optionally, the first and second rule portions are completed or resolved (block 340). This can include adding or modifying a match field and/or an action in the rule portion. In other words, a rule portion may need additional contextual information, match fields and/or actions in order to be configured to function in accordance with the initial received rule. In some embodiments, the first rule portion is modified to add a first action to forward incoming packets to the second underlay switch. In some embodiments, the first rule portion is modified to add a second action to tag incoming packets with a flow identifier. A flow identifier can include contextual information related to the packet and/or the flow rule. In some embodiments, the second rule portion is modified to add a match field corresponding to the flow identifier. Other modifications can be made to the first and second rule portions to ensure that the decomposed rule portions provide the complete information of the packet handling rule received in block 300.

The first rule portion is transmitted to the first underlay switch and the second rule portion is transmitted to the second underlay switch (block 350). In some embodiments, if it is determined that the match field of the packet handling rule does not specify a particular ingress port, the first rule portion can be transmitted to a plurality of underlay network switches. In some embodiments, the first rule portion can be transmitted to all underlay network switches.

Figure 8:
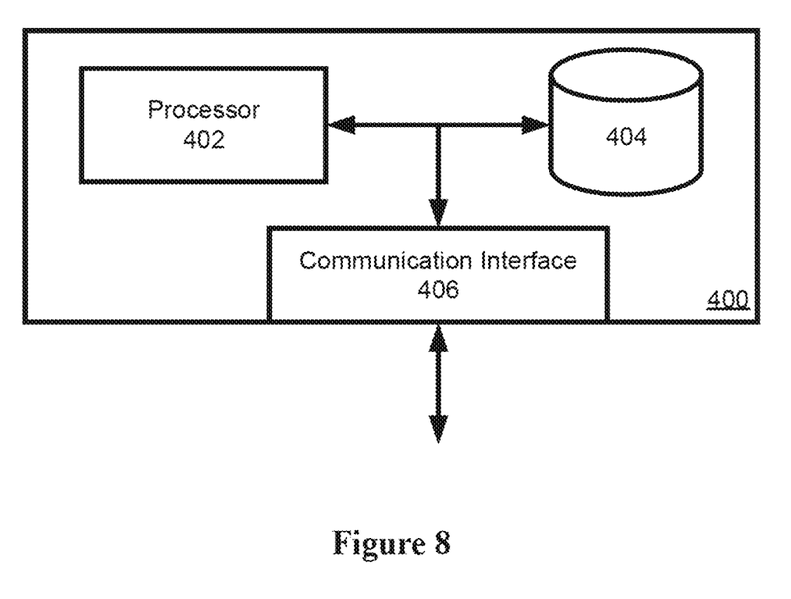
FIG. 8 is a block diagram of an example network element.

FIG. 8 is a block diagram illustrating an example network element or node 400 according to embodiments of the present invention. Network node 400 can be a switch, a server or an access controller configured to manage and/or distribute packet handling rules as have been described herein. The network node 400 includes a processor 402, a memory or instruction repository 404, and a communication interface 406. The communication interface 406 can include at least one input port and at least one output port. The memory 404 contains instructions executable by the processor 402 whereby the network element 400 is operable to perform the various embodiments as described herein. Network node 400 can be configured to operate as a flow switch, a Data Center Management System (DCMS), a Cloud Management System (CMS) or a Data Center SDN (DC-SDN) controller as have been discussed in the various embodiments.

According to some embodiments, network node 400 is operative to translate, decompose, and manage distribution of packet handling rules. Node 400 receives a packet handling rule including at least one match field and at least one associated action to be applied to incoming packets. Node 400 is configured to translate the received packet handling rule from an overlay network topology to an underlay network topology. Node 400 determines that the match field maps to a first underlay switch and the action maps to a second underlay switch. Node 400 is configured to decompose the translated packet handling rule into a first rule portion associated with the first underlay switch and a second rule portion associated with the second underlay switch. Node 400 can then transmit the first rule portion to the first underlay switch and transmit the second rule portion to the second underlay switch.

Figure 9:
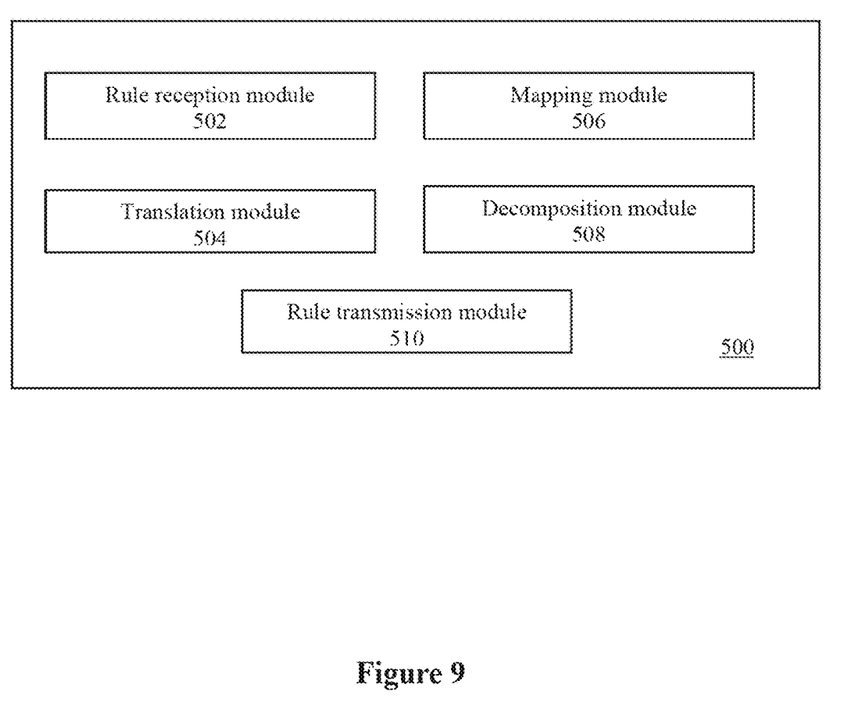
FIG. 9 is a block diagram of an example rules manager.

FIG. 9 is a block diagram of a rules manager entity 500 that can include a plurality of modules including, but not limited to, a rules reception module 502, a translation module 504, a mapping module 506, a decomposition module 508, and a rules transmission module 510.

Rule reception module 502 is configured for receiving a packet handling rule, the rule including a match field and an associated action to be applied to incoming packets. Translation module 504 is configured for translating the packet handling rule from an overlay network topology to an underlay network topology. Mapping module 506 is configured for determining that the match field maps to a first underlay switch and the action maps to a second underlay switch. Decomposition module 508 is configured for decomposing the translated packet handling rule into a first rule portion associated with the first underlay switch and a second rule portion associated with the second underlay switch. Rule transmission module 510 is configured for transmitting the first rule portion to the first underlay switch and the second rule portion to the second underlay switch.

Embodiments of the present disclosure can enhance the virtual network offerings in the cloud by providing a virtual flow network as part of the virtual infrastructure rather than limiting the connectivity services to basic L2 and L3 services. This enables an application provider to move a large set of virtualized applications, service chaining of network functions in particular, to the cloud.

Some embodiments have been described herein as using the OpenFlow protocol, but can also be implemented with other types of Software Defined Networking (SDN) protocols without departing from the scope of the present disclosure. OpenFlow is a communications protocol that gives access to the forwarding plane of a network switch or router over the network.

Those skilled in the art will appreciate that the switching elements described herein, such as an OpenFlow Switch, include a flow table for performing packet lookup. The flow table can contain a set of flow entries (header values to match packets against), activity counters, and a set of zero or more actions to apply to matching packets. All packets received by the switch are compared against the flow table. The non-limiting examples of flow rules described herein have used actions such as forwarding a packet out on a specific port for illustrative purposes.

It will be readily understood that more complex flow rules with additional actions can be implemented. An action list can be processed in a specific order on a matched packet. Other possible actions include dropping a packet, modifying a packet, encapsulating a packet, forwarding a packet to another flow table for further processing, etc. Such an additional flow table can be located in the same switch instance or in another switch in the network. In some embodiments, each flow table in a rule specified by the application provider can be mapped to an underlay switch where it is stored.

The present disclosure has not explicitly taken into account that a VM and/or a virtual switch can be down, migrated to another server, or that an instance of a service can be added or removed (scale-up/scale-down). These mechanisms are well understood in the area of cloud computing. Supporting these mechanisms can involve more intelligence in the CMS and/or DC-SDN related to the translation and distribution of the rules.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for distributing flow rules comprising:
   receiving a packet handling rule, the rule including a match field and an associated action to be applied to incoming packets, the match field including an overlay network ingress port;
   translating the packet handling rule from an overlay network topology to an underlay network topology;
   determining that the match field maps to a first underlay switch and the action maps to a second underlay switch in accordance with mapping the overlay network ingress port to an underlay network ingress port on the first underlay switch;
   decomposing the translated packet handling rule into a first rule portion, including the match field, associated with the first underlay switch and a second rule portion, including the action, associated with the second underlay switch; and
   transmitting the first rule portion to the first underlay switch and the second rule portion to the second underlay switch.

2. The method of claim 1, further comprising modifying the first rule portion by adding a first action to forward incoming packets to the second underlay switch.

3. The method of claim 1, further comprising modifying the first rule portion by adding a second action to tag incoming packets with a flow identifier.

4. The method of claim 3, further comprising modifying the second rule portion by adding a first match field corresponding to the flow identifier.

5. The method of claim 1, further comprising, responsive to determining that the match field does not specify an ingress port, transmitting the first rule portion to a plurality of underlay switches.

6. The method of claim 1, wherein the action includes an overlay network egress port.

7. The method of claim 6, further comprising mapping the overlay network egress port to an underlay network egress port on the second underlay switch.

8. A network node for distributing rules, the network node comprising a processor and a memory, the memory containing instructions executable by the processor whereby the network node is operative to:
- receive a packet handling rule, the rule including a match field and an associated action to be applied to incoming packets, the match field including an overlay network ingress port;
- translate the packet handling rule from an overlay network topology to an underlay network topology;
- determine that the match field maps to a first underlay switch and the action maps to a second underlay switch in accordance with mapping the overlay network ingress port to an underlay network ingress port on the first underlay switch;
- decompose the translated packet handling rule into a first rule portion, including the match field, associated with the first underlay switch and a second rule portion, including the action, associated with the second underlay switch; and
- transmit the first rule portion to the first underlay switch and the second rule portion to the second underlay switch.

9. The network node of claim 8, further operative to modify the first rule portion by adding a first action to forward incoming packets to the second underlay switch.

10. The network node of claim 8, further operative to modify the first rule portion by adding a second action to tag incoming packets with a flow identifier.

11. The network node of claim 10, further operative to modify the second rule portion by adding a first match field corresponding to the flow identifier.

12. The network node of claim 8, further operative to transmit the first rule portion to a plurality of underlay switches responsive to determining that the match field does not specify an ingress port.

13. The network node of claim 8, wherein the action includes an overlay network egress port.

14. The network node of claim 13, further comprising mapping the overlay network egress port to an underlay network egress port on the second underlay switch.

15. A non-transitory computer readable storage medium storing executable instructions, which when executed by a processor, cause the processor to:
- receive a packet handling rule, the rule including a match field and an associated action to be applied to incoming packets, the match field including an overlay network ingress port;
- translate the packet handling rule from an overlay network topology to an underlay network topology;
- determine that the match field maps to a first underlay switch and the action maps to a second underlay switch in accordance with mapping the overlay network ingress port to an underlay network ingress port on the first underlay switch;
- decompose the translated packet handling rule into a first rule portion, including the match field, associated with the first underlay switch and a second rule portion, including the action, associated with the second underlay switch; and
- transmit the first rule portion to the first underlay switch and the second rule portion to the second underlay switch.

* * * * *